Feb. 7, 1939.  A. WHITELAW  2,146,518
FRICTION CLUTCH FACING
Filed Sept. 11, 1935

Inventor:
Albert Whitelaw,
By Lee J. Gary
Attorney

Patented Feb. 7, 1939

2,146,518

UNITED STATES PATENT OFFICE 2,146,518

FRICTION CLUTCH FACING

Albert Whitelaw, Passaic, N. J., assignor to Raybestos-Manhattan, Inc., Passaic, N. J., a corporation of New Jersey Application September 11, 1935, Serial No. 40,097

2 Claims. (Cl. 192—107)

This invention relates to improvements in the manufacture of friction clutch facings of the type wherein a woven or braided strip of friction material containing a binder is bent to form an endless annular ring joined at the meeting edges by metal rivets, staples, integral interlocking joints, or the like.

Clutch facings of this general type have been in use for many years. They are made by weaving or braiding strands of asbestos yarn, asbestos roving, asbestos-cotton yarn, or asbestos yarn plied with a wire core or wire reinforcement into a continuous strip or tape of the approximate thickness and width desired. This continuous strip or tape is cut into strips of the required length suitable for the manufacture of a facing therefrom, and such strip bent in an arc to the form of a ring, the meeting edges being joined by integral interlocking joints, metal staples, rivets or the like into an endless annular ring.

Clutch facings of this type, due to their weight, exhibit a tendency to open up at the joint and fly off the clutch plates to which they are riveted, due to the high centrifugal force created during use.

It is an object of the present invention to improve the centrifugal strength of woven or braided clutch facings of the type referred to without losing any of the desirable characteristics thereof.

It is another object of the invention to provide a clutch facing of the type referred to having an increased tensile strength at the joint.

It is another object of the invention to provide a clutch facing of the type referred to having no tendency to open up at the joint and fly off the clutch plates due to the high centrifugal force created during use.

It is another object of the invention to provide a clutch facing of the type referred to characterized by better holding power under the rivet head.

Figure 1:
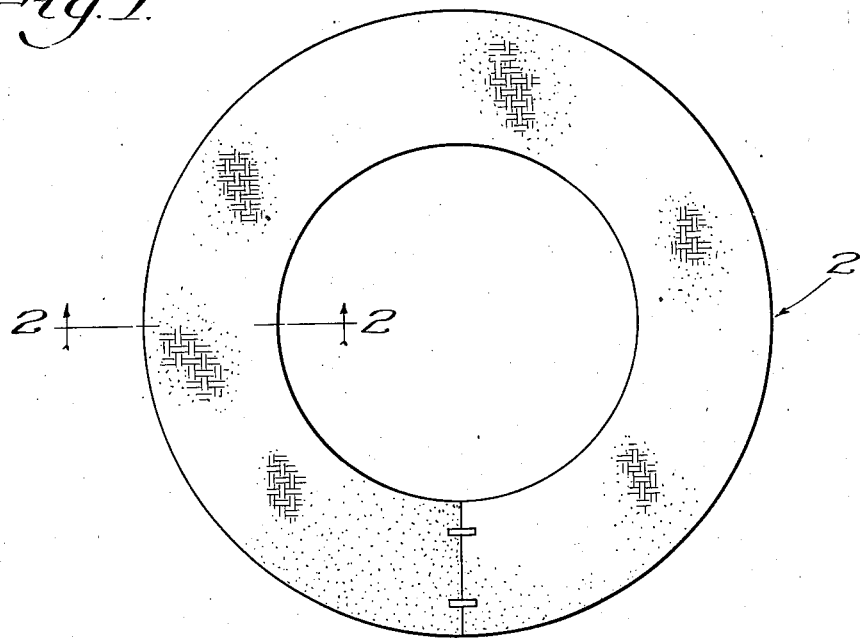
Figure 2:
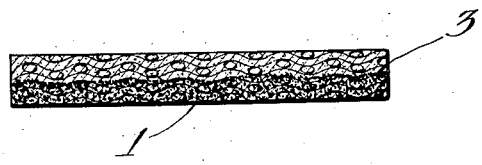

In the drawing, Fig. 1 is a face view of a friction facing. Fig. 2 is a sectional view taken on line 2—2 of Fig. 1.

The objects of the present invention are accomplished by reinforcing the face 1 of a ring such as the friction ring 2, which is to become the back face i. e. the face applied to the clutch plate as distinguished from the opposite face which will be used as the wearing face. This reinforcement of the back face 1 is accomplished by applying thereto a heat hardening liquid at a consistency or viscosity at which it will penetrate or impregnate the back face 1 to which it is applied but will not penetrate to the opposite (wearing) face as indicated at 3 in Fig. 2. The ring is thereafter subjected to heat to harden the liquid and produce a product, the backing of which is sufficiently reinforced to withstand high centrifugal force created during use.

In the preferred embodiment of the present invention the heat hardening liquid hereinbefore referred to is applied to the ring subsequent to the step of curing the saturant customarily used in the manufacture of the ring although it is to be understood that the heat hardening liquid applied to the rear face of the ring may be applied at any desired stage in the manufacture of the final product which will attain the desired object.

It is obvious that the consistency or viscosity of the heat hardening liquid used as the reinforcing medium may be considerably varied without departing from the scope of the invention. If the woven or braided base is relatively dense the viscosity of the heat hardening liquid will be relatively thin fluid whereas if the woven or braided base is relatively open the viscosity of the heat hardening reinforcing liquid will be relatively high. In any event the viscosity of the heat hardening liquid will be such that it will penetrate the face to which it is applied but will not penetrate through the body of the woven or braided structure to the opposite face.

The invention contemplates the use of a large number of heat hardening liquids, such as phenol furfural, glycerol phthalate, resins of higher boiling range, tar, acids, such as cresol, xylenols, etcetera, in combination with drying oils, but in its preferred embodiment makes use of a synthetic resin and more specifically a phenol-aldehyde resin. The resin is diluted with the proper solvent to a desired consistency and is either sprayed or brushed or applied by transfer rolls to the back face of the woven or braided facing. Preferably the structure is allowed to dry several hours after which it is subjected to the action of heat to convert the heat hardening liquid to a hardened condition in which condition it functions to bring about the desired reinforcement.

The actual benefit obtained is dependent to some extent upon the outside diameter of the clutch facing and the specific gravity of the material, but tests have indicated that reinforcement of the back face in accordance with the present invention has increased the spinning strength from 2,000 R. P. M. to 5,000 R. P. M.

I claim as my invention:

1. A friction clutch facing comprising a woven or braided strip of friction material in the form of an endless ring joined at the meeting edges, said ring containing a hardened binder, the back and a portion of the thickness only of said ring being reinforced against rupture with a heat hardened reinforcing medium.

2. A friction clutch facing comprising a woven or braided strip of friction material in the form of an endless ring joined at the meeting edges, said ring containing a hardened binder, the back and a portion of the thickness only of said ring being reinforced, to maintain said strip in the form of an endless ring, with a heat hardened reinforcing medium comprising essentially a synthetic resin.

ALBERT WHITELAW.